United States Patent
Mayer et al.

[11] Patent Number: 6,003,310
[45] Date of Patent: Dec. 21, 1999

[54] VARIABLE CATALYST SYSTEM

[75] Inventors: Thomas E Mayer, Glessen; Patrick Phlips, Cologne; Klemens Grieser, Langenfeld; Heinrich Z Krzykowski, Herdecke, all of Germany

[73] Assignee: Ford Global Technologies, Inc., Dearborn, Mich.

[21] Appl. No.: 09/112,952

[22] Filed: Jul. 9, 1998

[30] Foreign Application Priority Data

Jul. 9, 1997 [DE] Germany ............... 197 29 284
Jul. 9, 1997 [EP] European Pat. Off. ........ 9811221

[51] Int. Cl.⁶ .................................................. F01N 3/00
[52] U.S. Cl. ................ 60/287; 60/288; 60/323; 60/284; 60/324
[58] Field of Search ............... 60/323, 301, 284, 60/287, 288, 289, 292, 324

[56] References Cited

U.S. PATENT DOCUMENTS 3,545,414 12/1970 Thompson ................... 123/52
3,984,975 10/1976 Price ............................ 60/274
4,926,634 5/1990 Putz et al. ..................... 60/274
5,657,625 8/1997 Koga et al. .................... 60/274

FOREIGN PATENT DOCUMENTS 6159045 6/1994 Japan ........................... 60/288

*Primary Examiner*—Thomas Denion
*Assistant Examiner*—Binh Tran
*Attorney, Agent, or Firm*—Jerome R. Drouillard

[57] ABSTRACT

In a transverse-mounted cylinder-in-line internal combustion engine (1) fitted in a motor vehicle, the exhaust gases from the side of the internal combustion engine opposite to the direction of travel are led forwardly round the internal combustion engine and from there reach an NOx trap (8) arranged in the middle region of the vehicle. For rapid heating up on cold starting the three-way converter (12) is arranged immediately after the exhaust manifold (2), and in addition when a valve (9) is closed the exhaust gases are led through a short supply duct (5) directly to an exhaust duct (13) which opens into an NOx trap.

1 Claim, 1 Drawing Sheet

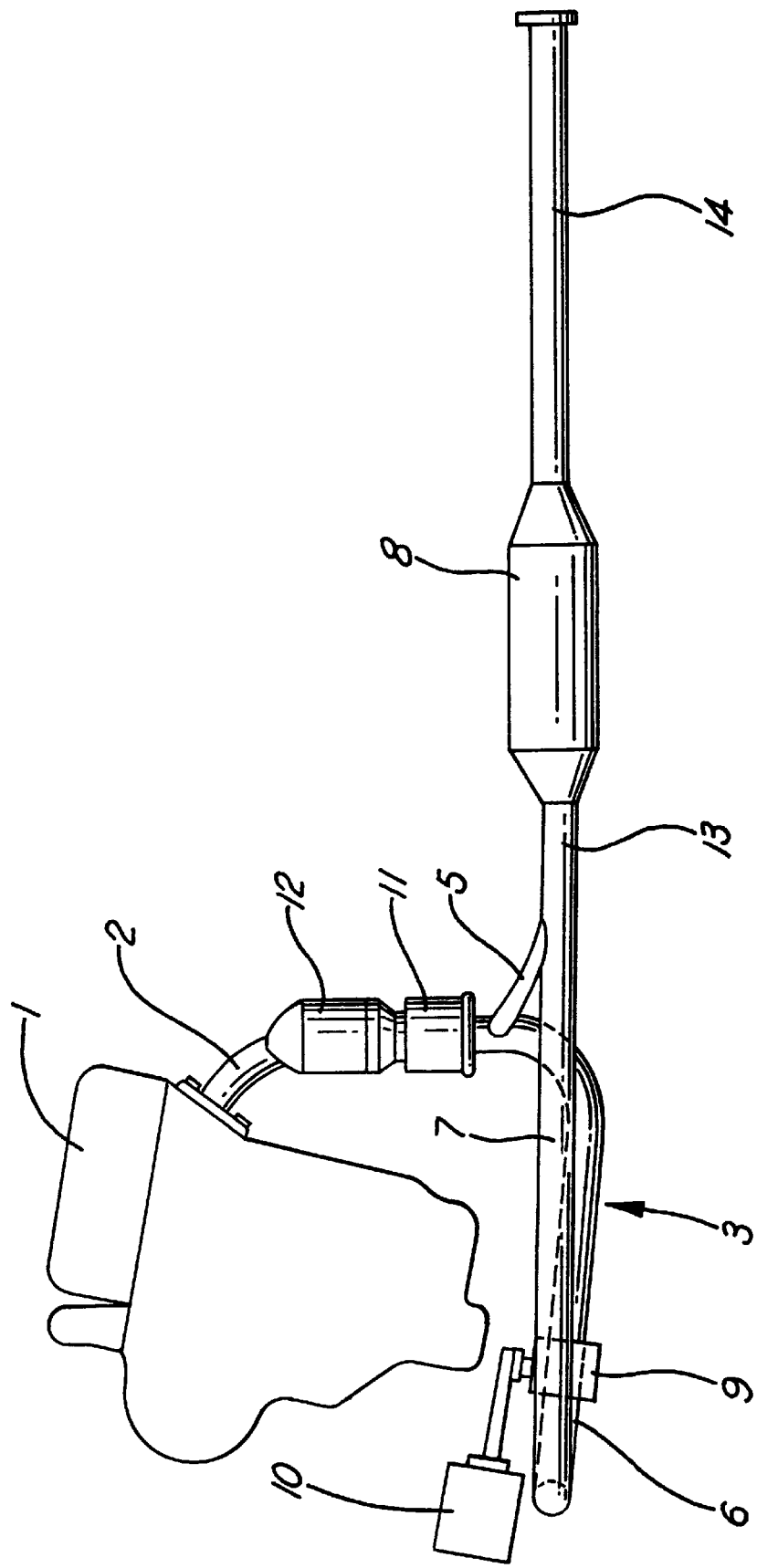

VARIABLE CATALYST SYSTEM

FIELD OF THE INVENTION

The invention relates to a motor vehicle having a front-mounted, four cylinder in-line internal combustion engine the exhaust gases from which are passed through a catalytic converter, wherein the exhaust ducts from the individual cylinders are combined on one side of the internal combustion engine into a common duct from which two supply ducts of different cross-section lead to the exhaust duct, the larger cross-section supply duct can be blocked by a valve, and the supply ducts for supplying the exhaust gases to the exhaust duct have different lengths, with the larger cross-section supply duct, located underneath the internal combustion engine, having a bent region in front of (in the direction of travel of the motor vehicle) and underneath the internal combustion engine, with the exhaust duct running from there counter to the direction of travel to the exhaust duct located underneath the passenger compartment, and the smaller cross-section supply duct forming a short connection between a region of the common duct near a decoupling element and the exhaust duct.

An arrangement of this kind is disclosed in German Offenlegungsschrift 42 18 834. There, in the case of a transversely mounted in-line engine in a motor vehicle, two ducts of the same length but of different cross-sections run from the internal combustion engine directly to the catalytic converter arranged in the rear region of the motor vehicle. In the larger cross-section duct a shut-off valve is provided whereby in the heating-up phase the larger cross-section duct is shut off and the exhaust gases are only supplied to the converter through the duct with the thinner cross-section. This has the disadvantage that because of the generally restricted spatial conditions it is difficult to route the ducts and the necessary length of the smaller cross-section exhaust duct leads to excessive heat losses.

While it is proposed in German Offenlegungsschrift 25 34 39 998 that where the exhaust gases are supplied to the converter through two different ducts these supply ducts should be of different lengths, it is difficult to arrange and guide these ducts inside the motor vehicle, and the arrangement shown does not lead to the desired results.

In the earlier-filed German application 196 51 239.5-13 an arrangement has already been proposed to form an arrangement such that the ducts supplying the exhaust gases to the converter have different lengths, with the larger cross-section duct, located below the internal combustion engine, having a bent region in front of the engine (in the direction of travel of the vehicle) and under the engine and running from there counter to the direction of travel to the converter located under the passenger compartment, with the smaller cross-section supply duct forming a short connection between a region of the common duct close to a decoupling element and a region of the exhaust duct adjacent to the converter.

With this arrangement a device for reduction of the NOx constituents of the exhaust gas can be located downstream of the three-way converter.

However, this arrangement has the disadvantage that the exothermic reaction of the three-way converter gives rise to a heavy thermal load on the device for reducing the NOx constituents, the NOx trap. This device is sensitive to high temperatures.

OBJECT OF THE INVENTION

Accordingly it is an object of the invention to provide an improvement of the arrangement described above in which the arrangement of three-way converter and NOx trap is such that serious thermal effects on the NOx trap by the heat generated exothermically from the three-way converter does not occur.

SUMMARY OF THE INVENTION

To this end, the exhaust manifold of the internal combustion engine is arranged so as to open directly into the three-way converter and the NOx trap is positioned (in the direction of flow of the exhaust gas) between the exhaust duct and the tail pipe.

As a result of this arrangement the heating of the exhaust gases by the exothermic reaction of the three-way catalyst is moderated by the passage of the gases within the bent region of the exhaust duct, so that heavy thermal stress on the NOx trap is avoided.

BRIEF DESCRIPTION OF THE DRAWINGS

An embodiment of the invention is shown by way of example in the drawings, in which the FIGURE shows a side view of the arrangement in accordance with the invention within the front region of the motor vehicle.

DETAILED DESCRIPTION OF A PREFERRED EMBODIMENT OF THE INVENTION

An internal combustion engine 1 has cylinders arranged in line; in the embodiment of the example the row of cylinders is disposed transverse to the direction of travel The exhaust gases from the internal combustion engine are supplied through an exhaust manifold 2 directly to a three-way catalytic converter 12. From there the exhaust gases are supplied via a decoupling element 11 and an exhaust duct system, which is denoted generally by 3, to a NOx trap 8.

Shortly after the decoupling element the possibility is provided of supplying the exhaust gases both to a larger diameter supply duct 4 and to smaller cross-section supply duct 5 which leads the exhaust gases by a short path to a exhaust pipe 13. The larger cross-section supply duct 4 then runs in the direction of travel to a bent region 6 which is disposed underneath the internal combustion engine 1 and in front (viewed in the direction of travel) of the internal combustion engine 1. The exhaust gases are then led on through an exhaust duct 7 which runs counter to the direction of travel and supplies the exhaust gases to the NOx trap, the converter 8. A tail pipe is indicated by 14.

Before the bent region 6 of the exhaust duct system 3 a shut-off valve 9 is provided, which lies between the supply duct 4 and the bent region 6. The shut-off valve 9 is operated by an actuator 10. The shut-off valve 10 can alternatively be located after the bent region 6, particularly if the cooling conditions there are better.

On starting up the internal combustion engine 1 the actuator 10 for the shut-off valve 9 first ensures that the supply duct 4 is closed, so that the exhaust gases reach the NOx trap 8 by the short path Depending on the temperature in the NOx trap 8, the shut-off valve 9 is then opened by means of the actuator 10 so that the path of the exhaust gases via the supply duct 4, the bent region 6 and the exhaust duct 7 is cleared. Since the supply duct 4 has a larger cross-section than the supply duct 5, by far the greater part of the exhaust gases then reaches the NOx trap 8 via the supply duct 4 and the bent region 6.

The arrangement of the three-way converter 12 in the duct immediately after the exhaust manifold 2 results in rapid heating up, which is desirable. Nevertheless on prolonged use the arrangement with the valve 9 open gives good cooling of the exhaust gases. In start-up operation, i.e. with the valve 9 closed, diversion of the exhaust gases via the supply duct 5 occurs; in this operating region, however, owing to the short duration of this operating state and also having regard to the need for initial heating up of both the internal combustion engine 1 and the three-way converter, the temperature of the gases supplied to the NOx trap is acceptable in respect of thermal stress on the NOx trap.

By this arrangement undesirable heating of the NOx trap to high temperatures by the exothermic reaction of the three-way converter is prevented, since after the three-way converter the exhaust gases are further supplied to the cooling coil arranged under the internal combustion engine.

What is claimed is:

1. A motor vehicle having a front mounted, four cylinder, in line internal combustion engine, the exhaust gases from which are passed through a catalytic converter, wherein exhaust ducts from the individual cylinders are combined on one side of the internal combustion engine into a common duct from which two supply ducts of different cross-section lead to an exhaust pipe, with the larger cross-section supply duct selectively blocked by a valve and with the two supply ducts for supplying the exhaust gases to the exhaust pipe having two different lengths, with the larger cross-section supply duct, located underneath the internal combustion engine, having a bent region in front of (in the direction of travel of the motor vehicle) and underneath the internal combustion engine, and with the exhaust duct running from the common duct to the exhaust duct located underneath a passenger compartment with the smaller cross-section supply duct forming a short connection between a region of the common duct near a decoupling element and the exhaust pipe, wherein the exhaust manifold (2) of the internal combustion engine (1) is arranged so as to open directly into a three-way converter (12) and an NOx trap is positioned (in the dirction of flow of the exhaust gas) between the exhaust pipe (13) and the tail pipe (14).

* * * * *